UNITED STATES PATENT OFFICE.

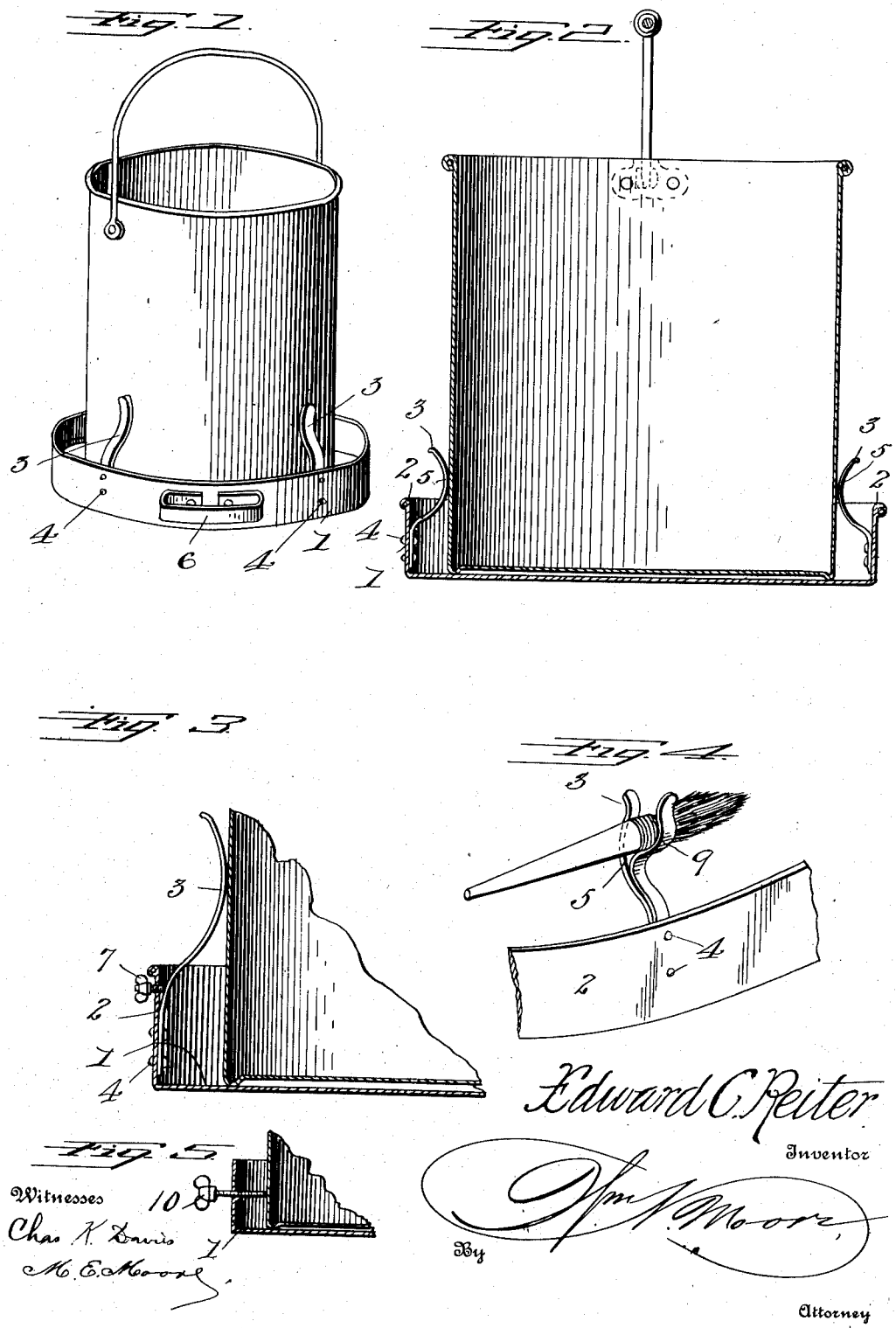

EDWARD CHARLES REITER, OF ROCKVILLE, CONNECTICUT.

DRIP-PAN.

No. 864,556.    Specification of Letters Patent.    Patented Aug. 27, 1907.

Application filed March 22, 1906. Serial No. 307,376.

*To all whom it may concern:*

Be it known that I, EDWARD CHARLES REITER, a citizen of the United States, residing at Rockville, in the county of Tolland and State of Connecticut, have invented certain new and useful Improvements in Drip-Pans, of which the following is a specification.

My invention relates to improvements in drip pans, and refers to a device particularly adapted for use in connection with paint buckets.

The main object of the invention, is the provision of a device which may be attached to an ordinary bucket or receptacle and will catch the drip or waste from the bucket, will save such overflow, and will protect the object upon which the receptacle is resting.

Other objects of the invention, are to provide a device for protecting the bottoms of cooking utensils, and to provide a convenient means for handling the said utensil.

With these and other objects in view, my invention consists of a drip pan having upturned flanges or edges, and adjustable means carried by the flange adapted to engage the walls of the receptacle.

My invention further consists of a drip pan embodying certain other novel features of construction and combination of parts substantially as herein disclosed.

Figure 1, is a perspective view of my improved drip pan as applied to an ordinary paint bucket. Fig. 2, is a central sectional view through the pan and bucket. Fig. 3, is a detail view of a modified form of the invention, showing means for adjusting the tension of the clasping springs. Fig. 4, is a detail view of a brush holding attachment to the pan. Fig. 5, is a sectional view of a modified form of pan attaching means.

In the drawings: the numeral 1, designates the pan proper, which is of convenient size, and is formed with the upturned edges or flanges 2. At convenient points in the circumference, springs 3, are secured to the flange by means of rivets 4, or other suitable fastenings. These springs are bent inwardly and are formed on the ends with outward-flaring lips 5, adapted to engage the walls of the receptacle to secure the pan thereto. A handle 6, is also secured to the flange and serves for lifting and transporting the pan and receptacle.

In the modified form of the invention shown in Fig. 3, a set screw 7, is mounted in the flange and engages the clamping spring, so that the tension of the spring may be regulated as desired.

In the modification shown in Fig. 5, the use of the springs is done away with, and set screws 8, are substituted therefor, so that buckets or receptacles of varying diameters may be accommodated in the pan.

From this description taken in connection with the drawings, it will be obvious that I have accomplished all the objects herein set forth, and have provided a practical and efficient article for the purposes named, which fills a long-felt want.

In Fig. 4, I have shown a brush holding attachment which may be applied to the pan, and consists of a spring strip or arm 9, which is secured upon one of the clamping springs, and with said spring, forms a pair of jaws to clasp the brush.

I claim:

1. A drip pan having upturned annular edges, a handle secured to the outer walls of the pan, clamping springs secured to the inner upright walls of the pan, said springs being bent inwardly to engage a vessel, the free ends of the springs being flared outwardly, and adjusting screws mounted in the walls of the pan to engage the springs and regulate the tension thereof.

2. The combination with a drip pan, and inwardly-directed clamping springs carried thereby, of an additional spring clip secured to one of the springs, said clip being of curved formation to form in combination with the spring, a pair of spring jaws adapted to hold a brush therebetween.

In testimony whereof I affix my signature in presence of two witnesses.

EDWARD CHARLES REITER.

Witnesses:
 LYMAN T. TINGIER,
 W. A. HOWELL.